Patented Jan. 5, 1932

1,839,983

UNITED STATES PATENT OFFICE

JOHN McGAVACK, OF JACKSON HEIGHTS, NEW YORK, ASSIGNOR TO THE NAUGATUCK CHEMICAL COMPANY, OF NAUGATUCK, CONNECTICUT, A CORPORATION OF CONNECTICUT

MANUFACTURE OF RUBBERIZED ARTICLES

No Drawing.    Application filed February 19, 1927. Serial No. 169,678.

This invention relates to the treatment of articles of the type having a rubber surface derived from a rubber latex. It is well known that rubber surfaces and articles prepared directly from a rubber latex have a tendency to absorb appreciable amounts of moisture. This appears to be in some measure due to the presence of the water soluble non-rubbers which form a part of natural latex. Another contributing factor to this water absorption is found in the presence of water soluble protective colloids of various sorts, which are present in the latex composition in order to preserve a homogeneous state, in which the rubber portion and the compounding ingredients are in substantially uniform mixture, and free from any marked tendency towards settling out.

The primary object of the present invention is to decrease the water absorption tendency of rubber surfaces derived from rubber compositions containing water soluble materials, and particularly from rubber latex, artificial or natural. Another object is to convert water soluble ingredients in such rubber surfaces into an insoluble state after fabrication of the articles in question.

The invention comprises passing a latex treated surface or an article derived from latex through a solution of a soluble soap, a washing bath and a precipitating bath wherein the soluble soap is converted into an insoluble compound, washing, and drying.

Inasmuch as the invention is not limited to any particular latex composition or rubber composition in which the rubber is in the discontinuous phase, it is not necessary to enter into specific proportions of ingredients. For the purpose of illustrating the invention, a rubber latex composition may be assumed to contain, in addition to the naturally occurring water soluble ingredients, compounding materials including hydrophilic protective agents. After a suitable latex composition has been spread upon a fabric, the coated fabric is passed from the take-off roll directly and without delay through a hot 10% solution of soap. This operation is preferably carried out by passing the treated fabric through a bath of the soap solution under a bar or knife, with which the cloth side of the fabric is in contact. From this bath, the fabric is passed through squeeze rolls and into a circulating bath of hot water, and thence through a hot 10% solution of ammonium alum, and thence through another washing bath of circulating clean hot water and then over a drying table. The several baths are preferably kept near the boiling point. These successive operations preferably form a continuous treatment.

The treatment with soap causes a deposit of the soluble soap on and in the rubber surface, as well as in the cloth, and this deposit is not washed out by the following warm water treatment. Passing directly from the first washing bath into the alum solution, the soap is rendered insoluble by the formation of the aluminum soap. Since the entire operation is carried out before the latex composition has had much opportunity to dry, the soap will have had opportunity to diffuse into the rubber surface, and consequently, upon treatment with the alum solution the insoluble soap is formed on and in the rubber surface, thus rendering the latter highly resistant to water. If the latex composition contains albuminous matter or soaps, many of these, if not all of them, will also be rendered insoluble by the alum treatment.

The above procedure yields a finished article or coated fabric which is not spotted by water and shows practically no water absorption or swelling, and is comparable in these respects with rubber coatings made from rubber doughs by the well known spreading methods. Tendencies towards unpleasant odors in the latex composition are removed by the treatment. As stated above any desired rubber compound may be rendered more resistant to water, but the invention appears to be most effective on latex compositions vulcanized or unvulcanized, natural, concentrated or artificial, in which an appreciable quantity of water soluble materials are present in the composition. The process above described may be applied to spread goods such as sheetings, garments, either single or double texture, dipped goods, such as footwear, surgeons' gloves, and in other instances where rubber articles are fabricated directly from an aqueous suspension of rubber. The invention is particularly suited for the treatment of latex used in the manufacture of clothing, but it may also be applied to rubber products in which a film of rubber is laid down from the treated latex. It may be used to advantage in spreading, coating or dipping processes or in processes where the rubber is deposited from the latex by electrolytic methods.

Under some conditions the soap treatment may be omitted, especially where the latex composition is known to contain a soluble soap. It is preferable, however, to insure a concentration of the soap on and near the surface of the coating in order to guarantee a high resistance to the influence of moisture. It may be pointed out that resin acids in the latex are likewise rendered insoluble in the treatment with the alum solution.

Any soluble soap may be employed. Instead of ammonium alum, other alums or soluble aluminum soaps may be used, and in general salts of the heavy metals, which have the property of forming insoluble soaps may be employed. Among such compounds are magnesium sulphate, potassium antimonyl tartrate, zinc chloride, lead acetate, calcium acetate.

In the treatment of rubberized fabrics which are intended for use in the manufacture of waterproof clothing, it is desirable to treat the thread with the soap solution and with the alum, in order that the thread may not function as a wick to cause leakage or that it may not shrink and cause puckering.

While particular reference has heretofore been made to rubber latex, it is to be understood that the latex of balata and gutta percha may similarly be treated to advantage, and also artificially prepared latex or, more broadly, any form of aqueous dispersions of rubber or the like containing water soluble ingredients which, if retained in the dry form, are likely to be objectionably spotted by water, or otherwise affected by water.

In the claims the term latex without qualification is intended to comprehend natural, concentrated or artificial latices of rubber, balata and gutta percha and whether vulcanized or unvulcanized. The term "rubber goods" as used in the claims is generic to articles composed entirely of rubber and to associations of rubber and strain resisting material, including what are known in the art as single and double texture proofed goods. The expression "water resistant" comprehends the elimination of water absorption and the effects thereof, including spotting, swelling, puckering, wrinkling, etc.

Having thus described my invention, what I claim and desire to protect by Letters Patent is:

1. The method of rendering rubber goods water-resistant, which comprises forming a latex coating and incorporating a water soluble soap in the coating material while wet and treating said coating with an agent adapted to insolubilize water soluble ingredients therein.

2. The method of rendering rubber goods water-resistant, which comprises forming a latex coating, treating the coating while wet with a water soluble soap, and then subjecting the thus treated coating while wet to an agent rendering insoluble ingredients therein which are water soluble.

3. The method of rendering rubber goods water-resistant, which comprises forming a latex coating, treating the coating while wet with a soluble soap, and then subjecting the treated coating while wet to the action of an agent adapted to insolubilize water soluble ingredients in the coating.

4. The method of rendering rubber goods water-resistant, which comprises forming a latex coating, treating the coating while wet with a soluble soap and then while the coating is wet with a metallic salt in hot aqueous solution whereby to penetrate the coating and form insoluble compounds of the soluble soap and other water soluble ingredients in the coating.

5. The method of rendering rubber goods water-resistant, which comprises forming a latex coating, treating the coating while wet with a water soluble soap, subjecting the thus treated coating while wet to an agent rendering insoluble ingredients therein which are water soluble, washing, and drying.

6. The method of rendering rubber goods water-resistant, which comprises forming a latex coating, successively subjecting said coating while wet to treatments with soluble soap and a hot metallic salt solution, washing, and drying.

7. The method of rendering rubber goods water-resistant, which comprises forming a latex coating, subjecting the coating while wet to a soluble soap at an elevated temperature, washing at an elevated temperature, subsequently treating with a metallic salt in solution, said metallic salt being capable of insolubilizing a soap, washing, and drying.

8. The method of rendering rubber goods water-resistant, which comprises forming a latex coating, treating the coating with a boiling solution of a soluble soap, washing in boiling water, subjecting the thus treated coating to a heated solution of a metallic salt adapted to insolubilize the soap on and in the surface, washing the surface, and drying.

9. The method of rendering rubber goods water-resistant, which comprises forming a latex coating, treating the coating while wet with a soluble soap, subsequently subjecting the treated wet coating to a hot alum solution for insolubilizing said soap and water soluble ingredients in the coating, and washing.

10. A method of rendering latex coated fabric resistant to water, which comprises passing the coated fabric while wet successively through soluble soap, warm water, a hot solution of a metallic salt adapted to insolubilize the soap and water soluble ingredients in the coating, washing, and drying.

11. The method of rendering rubber goods water-resistant, which comprises forming a latex coating, successively subjecting said coating while wet to treatments with soluble soap and a hot heavy metal salt solution, washing, and drying.

12. The method of rendering rubber goods water-resistant, which comprises forming a latex coating, successively subjecting said coating while wet to treatments with soluble soap and a hot alum solution, washing, and drying.

13. A method of rendering latex coated fabrics resistant to water, which comprises passing the coated fabric while wet successively through soluble soap, warm water, a hot solution of a heavy metal salt adapted to insolubilize the soap and water soluble ingredients in the coating, washing and drying.

14. A method of rendering latex coated fabrics resistant to water, which comprises passing the coated fabric while wet successively through soluble soap, warm water, a hot solution of an alum adapted to insolubilize the soap and water soluble ingredients in the coating, washing, and drying.

15. As a new product, a rubber surfacing containing substantially all the naturally-occurring non-aqueous non-rubber constituents of natural latex including water solubles a portion of which water solubles has been rendered water insoluble, the rubber thereof having the colloidal structure of unmilled rubber and being intimately associated with a water insoluble soap, said surfacing having increased ability to withstand water absorption.

16. As a new product, a dried rubber surfacing containing substantially all the naturally-occurring non-aqueous non-rubber constituents of natural rubber latex including water solubles a portion of which water solubles has been rendered water insoluble, the rubber thereof having the colloidal structure of unmilled rubber and being intimately associated with a water-resisting heavy metal soap, said surfacing having increased ability to withstand water absorption.

17. As a new product, a dried rubber surfacing containing substantially all the naturally-occurring non-aqueous non-rubber constituents of natural rubber latex including water solubles a portion of which water solubles has been rendered water insoluble, the rubber thereof having the colloidal structure of unmilled rubber and being intimately associated with a water-resisting aluminum soap, said surfacing having increased ability to withstand water absorption.

18. As a new product, a rubber surfacing formed from a natural latex composition and containing substantially all of the natural non-aqueous constituents of the latex, at least a portion of the natural water solubles of the latex having been converted and fixed in the rubber surfacing in a water insoluble condition, the rubber of the surfacing having the colloidal structure of unmilled rubber and being intimately associated with a water insoluble soap, said surfacing having increased ability to withstand water absorption.

19. As a new product, a dried rubber surfacing formed from a natural latex composition and containing substantially all of the natural non-aqueous constituents of the latex, at least a portion of the natural water solubles of the latex having been converted and fixed in the rubber surfacing in a water insoluble condition, the rubber of the surfacing having the colloidal structure of unmilled rubber and being intimately associated with a water-resisting heavy metal soap, said surfacing having increased ability to withstand water absorption.

20. As a new product, a dried rubber surfacing formed from a natural latex composition and containing substantially all of the natural non-aqueous constituents of the latex, at least a portion of the natural water solubles of the latex having been converted and fixed in the rubber surfacing in a water insoluble condition, the rubber of the surfacing having the colloidal structure of unmilled rubber and being intimately associated with a water-resisting aluminum soap, said surfacing having increased ability to withstand water absorption.

Signed at Saegerstown, county of Crawford and State of Pennsylvania, this 7th day of February, 1927.

JOHN McGAVACK.